United States Patent [19]

Emmett

[11] Patent Number: 4,925,259

[45] Date of Patent: May 15, 1990

[54] MULTILAYER OPTICAL DIELECTRIC COATING

[75] Inventor: John L. Emmett, Pleasanton, Calif.

[73] Assignee: The United States of America as represented by the United States Department of Energy, Washington, D.C.

[21] Appl. No.: 260,429

[22] Filed: Oct. 20, 1988

[51] Int. Cl.$^5$ ............................ G02B 5/26; G02B 5/28
[52] U.S. Cl. ...................................... 350/1.6; 350/166
[58] Field of Search ........................ 350/164, 166, 1.6

[56] References Cited

U.S. PATENT DOCUMENTS

| | | | |
|---|---|---|---|
| 3,737,292 | 6/1973 | Keck et al. | 65/3 |
| 4,145,458 | 3/1979 | Koenings et al. | 427/39 |
| 4,214,818 | 7/1980 | Choyke et al. | 350/310 |
| 4,243,398 | 1/1981 | Nomura et al. | 65/2 |
| 4,371,587 | 2/1983 | Peters | 428/446 |
| 4,372,648 | 2/1983 | Black | 350/96.33 |
| 4,522,485 | 6/1985 | Kamiya et al. | 355/11 |
| 4,545,646 | 10/1985 | Chern et al. | 350/162.2 |
| 4,659,178 | 4/1987 | Kyogoku | 350/166 |
| 4,840,442 | 6/1989 | Mouchart et al. | 350/1.6 |

FOREIGN PATENT DOCUMENTS

2312945 9/1973 Fed. Rep. of Germany ....... 350/1.6

OTHER PUBLICATIONS

Gribou, B. G. et al., "Preparation of Optical Coatings by the Chemical Deposition Method from the Gaseous Phase", Sov. J. Opt. Technol. 53(5), May 1986, pp. 296–305.

SPIE, vol. 584, "Optical Fiber Characteristics and Standards", pp. 33–37.

Primary Examiner—Bruce Y. Arnold
Attorney, Agent, or Firm—L. E. Carnahan; Henry P. Sartorio; William R. Moser

[57] ABSTRACT

A highly damage resistant, multilayer, optical reflective coating includes alternating layers of doped and undoped dielectric material. The doping levels are low enough that there are no distinct interfaces between the doped and undoped layers so that the coating has properties nearly identical to the undoped material. The coating is fabricated at high temperature with plasma-assisted chemical vapor deposition techniques to eliminate defects, reduce energy-absorption sites, and maintain proper chemical stoichiometry. A number of differently-doped layer pairs, each layer having a thickness equal to one-quarter of a predetermined wavelength in the material are combined to form a narrowband reflective coating for a predetermined wavelength. Broadband reflectors are made by using a number of narrowband reflectors, each covering a portion of the broadband.

29 Claims, 8 Drawing Sheets

MULTILAYER OPTICAL DIELECTRIC COATING

The United States Government has rights in this invention pursuant to Contract No. W-7405-ENG-48 between the U.S. Department of Energy and the University of California for the operation of the Lawrence Livermore National Laboratory.

BACKGROUND OF THE INVENTION

1. Field of the Invention.

This invention relates to dielectric coatings for optical elements, and more particularly, to coatings which have improved resistance to damage by incident radiation of high energy.

2 Prior Art.

Dielectric coatings for optical applications are generally formed by vacuum evaporation, sputtering, or low-temperature solution deposition over suitable glass, ceramic, or metal substrate material. The particular optical function and the wavelength or wavelengths of use for the optical coating dictates the coating design. Here the term coating design refers to the number of discrete layers of material to be deposited, the thickness of these layers and materials from which the layers are to be fabricated. The difference in refractive index between the materials that form the discrete layers is the physical property that, in combination with the coating design, gives the coating its unique function. For example, coatings can be designed to function as reflectors, anti-reflectors, polarizers, and other optical elements.

In the prior art coatings, use of discrete layers of different dielectric materials usually results in optical coatings having low thresholds for damage when subjected to incident light from a high-power laser source. Laser-light induced damage in prior art coatings can be attributed to one or more of the following factors:

a. Thermomechanical and/or chemical incompatibility between layers of different materials;
b. Optical absorption in the coating materials (100 to 100,000 times greater than pure silica) and localized defects caused by the inability to maintain natural chemical stoichiometry during deposition of a coating;
c. Incorporation of dust, dirt, or other light-absorbing particulate matter within the coating during deposition; and
d. The presence of voids or microstructural defects formed in the coating layer.

Bulk fused silica can be produced by a chemical vapor deposition (CVD) process. Pure silica produced by such a process has very good damage resistance to high-energy laser pulses. A CVD process continuously deposits silica in layers each a few angstroms thick. Thousands of layers are deposited to form a monolithic fused silica blank.

The fiber optic industry has developed processes for fabricating optical waveguide performs using silica layers with different indices of refraction. For example, U.S. Pat. No. 3,737,292 issued to D. B. Keck et al. describes an optical waveguide which has a silica core doped to increase its index of refraction and which has another cladding of undoped silica.

SUMMARY OF THE INVENTION

It is an object of the invention to provide a multi-layer dielectric coating for optical elements which coating is designed to have a high threshold for damage caused by a high flux of incident radiation.

It is another object of the invention to provide optical coatings which can handle greater energy flux densities without damage so that either smaller optical elements can be used or energy levels can be increased.

It is another object of the present invention to provide a multi-layer dielectric coating for optical elements which is fabricated such that minimum internal stress occurs between layers.

It is another object of the invention to provide a multi-layer optical coating of alternating doped and undoped layers with small differences in indices of refraction between said layers such that the doped and undoped layers are thermomechanically and chemically compatible.

It is another object of this invention to provide a multilayer dielectric coating with differences in index between layers produced by either doping the layers with different dopants or by using the same dopant but at different concentrations or by alternating doped and undoped layers.

It is another objective of this invention to provide a multilayer dielectric optical coating in which the index of refraction profile within a single quarterwave layer can be tailored in a stepwise fashion.

It is another object of this invention to eliminate light absorbing particulate material in the coating layers by fully oxidizing this material using an oxidizing process atmosphere.

It is another object of this invention to minimize the bulk optical absorption of the coating layers at the design wavelengths by controlling the stoichiometry of the coating material and dopants using an oxidizing process atmosphere.

It is another object of the invention to provide a multi-layer dielectric coating having 100–100,000 or more layers without seriously degrading the thermomechanical characteristics of said coating.

It is another objective to provide coatings which can be used on high power, broadband light sources such as flashlamps because of their extreme resistance to damage by optical radiation.

It is another objective of this invention to provide a means for fabricating the substrate of the optical coating and a protective overcoat in a single set of process operations.

In accordance with these and other objects of the invention, an optical coating is provided which is formed from a number (typically greater than 100) of alternating layers of doped and undoped material. The dopant concentrations are held to values such that the variation in the indices of refraction between the doped and undoped layers is small, typically between 0.1 and 5% but can be as high as 15% with special dopants. This permits the doped and undoped layers to be thermomechanically and chemically compatible. Preferably such multi-layer coatings are formed in a controlled atmosphere preferably an oxidizing atmosphere containing oxygen, chlorine, fluorine, water or combinations of these or other oxidizing gases, at a temperature high enough to ensure that the coating and any foreign particulates contained in the coating are fully oxidized to thereby prevent either bulk or localized energy absorption when the coating is subject to high energy flux densities such as from a high-energy laser pulse. Coatings prepared by the current art have high absorption, typically 10 to 100 times greater than the material deosited by the present invention because of the inability of the current art to fully oxidize the coating material. Coatings formed using chemical vapor deposition (CVD) or plasma-assisted CVD permit the various layers of the coatings to be incrementally built up. When a plasma assisted CVD process is used, for example, deposition increments as small as 5–10 Angstroms can be achieved. Undoped or doped layers of suitable thickness can be formed over such coatings to serve as protective overcoating or even as the support substrates for such coatings.

By using the small deposition increments possible with plasma-assisted CVD, the profile of the refractive index within a given coating layer can be tailored with resolution of the increment size of between 5–10 Angstroms. For example, a given coating layer or series of layers having an index profile approximating a sinusoidal wave or a portion of a sinusoidal wave can be fabricated.

Reflective optical coatings are produced by having alternating doped and undoped layers or alternating layers of different dopants or doping concentrations, where each of the layers has an optical thickness of one-quarter wavelength for the particular wavelength to be reflected. The reflectance and bandwidth of such reflective layers is controlled by the number of layer-pairs of doped and undoped layers or number of layer-pairs of differently doped layers used as well as by the difference in the indices of refraction between the layers. Optical reflectors having greater bandwidths are formed by fabricating two or more reflective coatings adjacent to each other in a composite coating. Similarly, optical reflectors that are fully or partially reflecting across more than one spectral region are fabricated by controlling the number of layer pairs and quarter-wave optical thickness of the deposited layers.

Selectively reflective coatings can be advantageously used to tailor the spectral output from broadband light sources such as hot plasmas produced by gas discharges. A composite stack of reflective coatings is deposited on either the inside or outside (or both) of a quartz envelope surrounding the light source. The composite stack consists of sets of reflective coatings of alternating doped and undoped layers or differently doped layers, with each layer of a particular set of layers having a thickness equal to one-fourth of a wavelength to be reflected back into the light source media. The composite stack of reflective coatings for a light source is designed to reflect the undesired wavelengths back into the light source medium while transmitting the desired wavelengths.

A flashlamp is one example of a light source whose broadband spectral output can be tailored using the deposited reflective coating. A flashlamp is a device that converts stored electrical energy into light by means of a sudden electrical discharge. Selectively reflective coatings for flashlamps are formed by coating the inside or outside of the fused silica envelope of a flashlamp with a composite stack of reflective coatings. The composite reflective coating is comprised of sets of alternating doped and undoped layers or differently doped layers, where each set of layers is designed to reflect a specific wavelength back into the flashlamp media. The composite of all sets of coating layers for a flashlamp light source is designed to reflect the undesired wavelengths back into the light source media while transmitting the desired wavelengths. In current coating art such flashlamp reflective coatings are easily damaged by the high flux of broadband radiation produced by the flashlamp plasma and thus these current art coatings are of limited utility.

A flashlamp used to pump solid state laser gain media is one example of a flashlamp light source whose broadband spectral output can be tailored using the inventive deposited reflective coating. Flashlamps made using the prior art have no reflective coatings and as a consequence only that part of the broadband spatial output that overlaps the narrow absorption bands of the solid state media is used in the pumping process. That portion of the spectral output from the flashlamp that does not overlap the absorption band is unused. By this invention, selectively reflective coatings for laser flashlamps are designed to reflect the unused wavelengths back into the flashlamp media while passing wavelengths that excite the pump bands of the laser. The reflected energy is absorbed and then re-emitted by the flashlamp medium to thereby improve the electrical-to-optical energy conversion efficiency for the flashlamp, over the desired range of wavelengths.

A flashlamp used to pump Neodymium-doped solid state laser medium is one specific example of a laser flashlamp light source whose broadband spectral output can be tailored to match the pump bands of the dopant Neodymium ion. Neodymium ion pump bands occur over a broad spectral region between 400 and 940 nm. A prior art flashlamp has a broadband output such that the wavelengths less than 400 nm and greater than 940 nm are unused by the solid state laser medium. Selectively reflective coatings for flashlamps used to pump Neodymium-containing solid state laser material are designed to reflect wavelengths between 250 to 400 nm and between 940 to 1200 nm back into flashlamp media while passing wavelengths between 400 and 940 that excite the Neodymium ion pump bands. The reflected energy is absorbed and then re-emitted by the flashlamp medium.

A typical undoped material for coatings of the type contemplated by the present invention is fused silica. Typical dopants are $TiO_2$, $GeO_2$, $P_2O_5$, F, $B_2O_3$, $Al_2O_3$, Cl, $Ce_2O_3$, $Sb_2O_3$, $Ta_2O_5$ and N. The list of typical dopant materials is not meant to be exhaustive nor restrictive; many other elements or materials will produce refractive index changes when used as dopants. The important criteria is that the doped and undoped layers maintain thermomechanical and chemical compatibility.

Additional objects, advantages and novel features of the present invention will be set forth in the following description and will in part become apparent to those skilled in the art upon examination of the following or may be learned by practice of the invention. The objects and advantages of the present invention may be realized and obtained by means of the instrumentalities and combinations which are pointed out in the appended claims.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
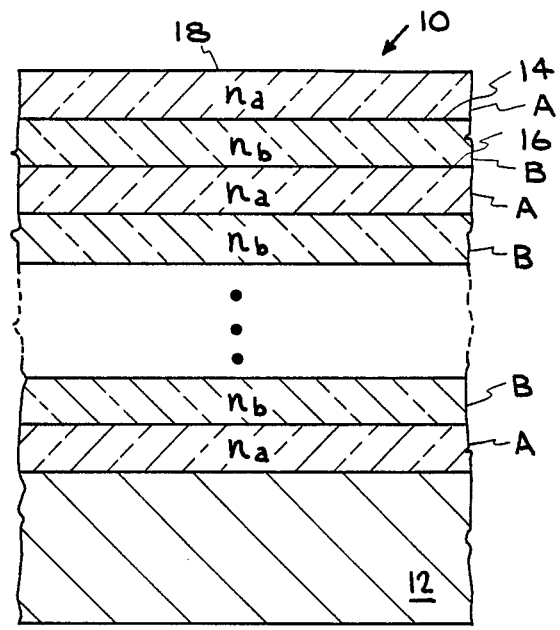
FIG. 1 is a schematic cross-sectional diagrammatic representation of a conventional dielectric coating.

FIG. 1 shows a cross-sectional schematic representation of a conventional dielectric coating 10 formed on a substrate 12 of, for example, inorganic glass, ceramic, or metal. The conventional coating 10 is fabricated by vacuum evaporation, sputtering, or low temperature solution deposition. The coating 10 is formed from a number of layerpairs of a material A and of a material B, where material A has an index of refraction $n_a$ and material B has an index of refraction $n_b$. Typically, material A and material B are different materials with different physical characteristics. To form, for example, a reflective coating for a particular wavelength the individual layers of material A and of material B each have a thickness of one-fourth wavelength within that material The differences in the materials used for each layer and the processes used to produce such coatings cause such coatings to have energy absorbing sites such as voids, local defects, and contamination sites as well as high internal thermomechanical stresses that result in low thresholds for damage when subjected to high-energy radiation as for example in a laser pulse. This is particularly true at the abrupt interfaces between the different materials, typically shown as 14,16. The number of layer-pairs of dissimilar materials required to form a reflective coating depends on the magnitude of the refractive index difference between those materials In general the higher the refractive index difference the fewer the number of layer-pairs required. Typically the index difference may range between 20 to 60% of the value of the low index material and the number of layer-pairs is less than 30–40. The chemical stoichiometries of the materials comprising the conventional coating typically are not of the fully oxidized form, leading to bulk optical absorption loss 10 to 100 times greater than that of the desired fully oxidized form.

Figure 2:
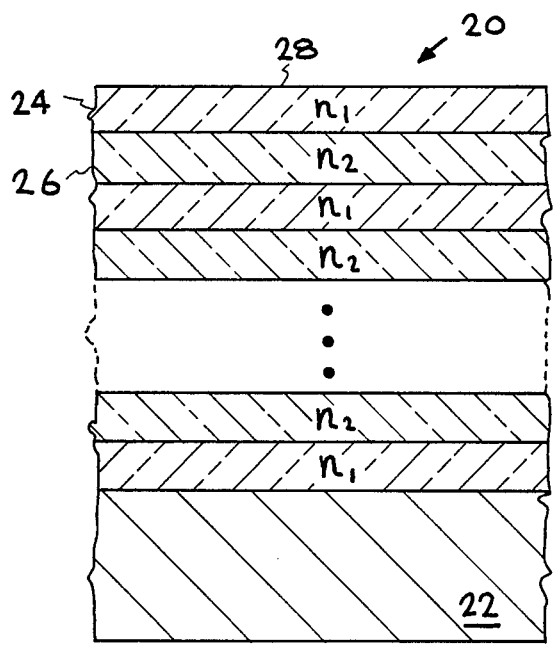
FIG. 2 is a schematic cross-sectional representation of a damage-resistant dielectric coating according to the present invention.
Figure 2:
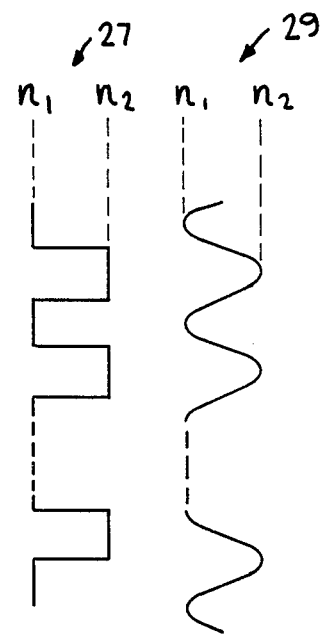

FIG. 2 shows a cross-sectional schematic representation of a damage-resistant dielectric coating 20 according to the invention. The damage-resistant dielectric coating 20 is typically fabricated over a substrate 22 of, for example, fused silica using chemical vapor deposition CVD techniques. When a pulsed plasma assisted process is used, deposition thicknesses as small as 5–10 Angstroms are achieved. Individual coating layers as shown by 24,26 are formed by successively depositing 5–10 Angstrom increments until they build up to the desired layer thickness. Layer-pairs comprised of either pairs of doped and undoped layers or pairs of differently doped layers are formed by continuing the CVD gas process and varying the concentration of dopant added to the reactive CVD mixture. One of the layers (24) in a layer-pair has an index of refraction profile $n_1$ and the other layer has an index of refraction profile $n_2$. The index profile of any given layer pair can be a simple square wave 27 varying from a maximum $n_2$ to $n_1$ or a specific profile such as, for example, a sinusoidal wave 29 having refractive index maxima and minima of $n_2$ and $n_1$, respectively The minimum index spatial resolution is 5–10 Angstroms and is determined by the minimum deposition thickness of 5–10 Angstroms. If the doping levels are low enough so that there are distinct interfaces or abrupt changes between layer, the coating as a whole can have properties nearly identical to the undoped substrate material and is substantially free of thermomechanical stress. If a coating is fabricated at a sufficiently high temperature, for example, greater than ,000° C. under a controlled oxidizing atmosphere condition such as pure $O_2$, this serves to eliminate light absorbing inclusions, eliminate damage-causing structural defects, reduce absorption, and maintain proper chemical stoichiometry. The optical absorption losses for the reflective coating by the present invention are measured to be 0.0001% to 0.0002% of the incident light energy at 500 nm compared to measured values of typically 0.05% and at best 0.002% for a conventional coating. This represents an improvement of about 10 to 100 fold for the inventive coating over the prior art. To form a multi-layer reflective coating it is necessary that each individual layer have a thickness of one-quarter of an optical wavelength within that material as defined by the following equation:

$$t = \lambda/(4 \cdot n) \tag{1}$$

where t is the quarterwave thickness, $\lambda$ is the wavelength in vacuum and n is the refractive index at the wavelength, $\lambda$. Using CVD, it is therefore possible to make an optical coating have many hundreds, and even thousands, of layer-pairs. As a consequence, the difference in the indices of refraction between two adjacent layers can be kept very low and a desired reflectivity characteristic for a coating 20 is obtained by use of any alternating layers 24,26 of doped and undoped material or of differently doped material which have very similar indices of refraction. For example, the difference in indices of refraction for the coating layers according to the invention would vary between 0.1 and 1%. Because the materials of the differently doped layers 24 and 26 are so similar in thermomechanical properties and because a high temperature CVD produces very dense, defect-free, low optical absorption amorphous films with correct chemical stoichiometry as the films are being formed, it is possible to fabricate a coating 20 having superior damage-resistance to incident optical radiation, approaching the damage resistance of pure fused silica. This means that in high-power laser applications optical coatings produced according to the invention can withstand much higher energy flux densities approaching, for example, that of pure fused silica. Prior art thin film dielectric optical coatings have previously limited laser flux densities to lower levels. For a given reflector area, use of the present invention will permit much higher flux densities to be used. Use of the inventive coating will also allow much smaller reflector areas to be able to handle the same energy levels which were previously handled with larger reflectors having the prior art coatings.

Figure 3:
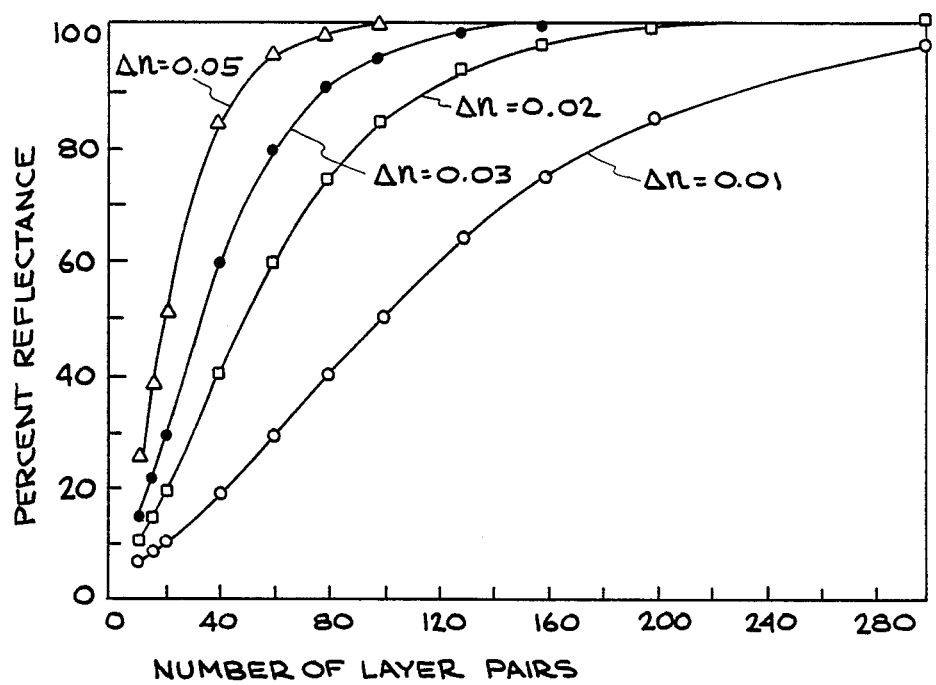
FIG. 3 is a plot of percent reflectance versus number of layer pairs, with small differences in index of refraction as a parameter, for a multilayer, thin-film dielectric coating comprised, for example, of alternating layers of silica and doped silica.
Figure 4:
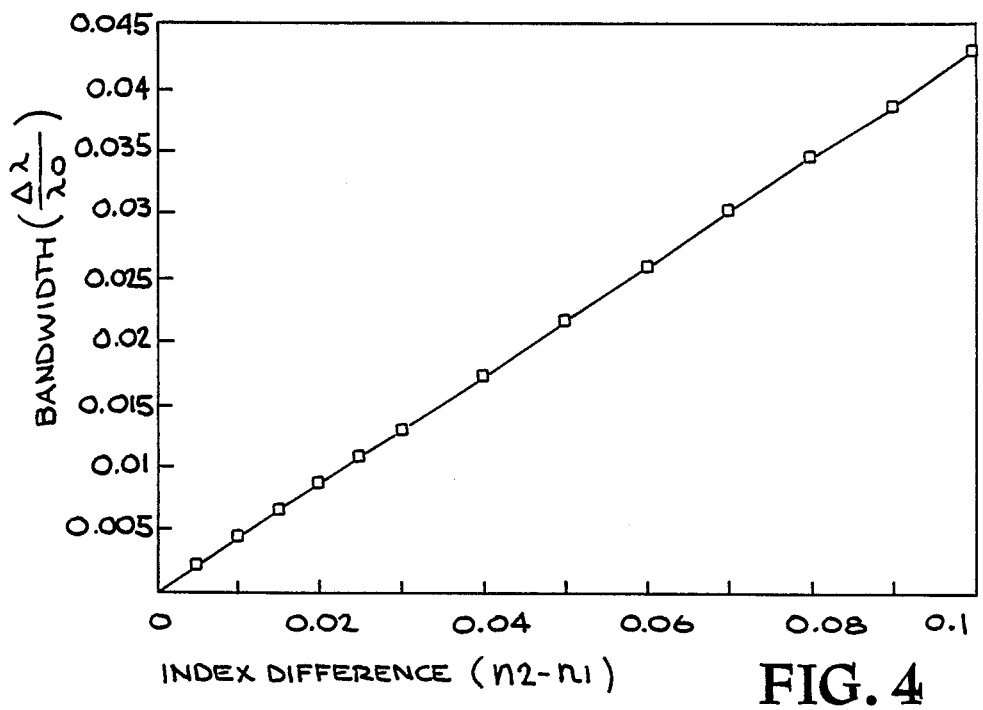
FIG. 4 is a plot of optical bandwidth of a reflective coating versus small differences in index of refraction for a multilayer thin film coating.

FIG. 3 and FIG. 4 will aid in understanding the significance of the present invention shown by FIG. 2 in comparison to the prior art coatings depicted in FIG. 1. FIG. 3. is a plot of reflectance R versus number of optical coating layer-pairs for various values for the difference in index of refraction, $n_2 - n_1$, between adjacent layers. The reflectance R for a multilayer thin-film dielectric coating where each layer thickness is equal to one-quarter wavelength is given by the following equation:

$$R = \left[ \frac{1 - \left(\frac{n_2}{n_1}\right)^{2N} \left(\frac{n_2}{n_S}\right)^2}{1 + \left(\frac{n_2}{n_1}\right)^{2N} \left(\frac{n_2}{n_S}\right)^2} \right]^2 \tag{2}$$

where $n_2$, $n_1$ and $n_S$ are the indices for the high index layer, low index layer and substrate, respectively and N is the number of layer pairs. The reflectance values plotted in FIG. 3 were calculated assuming $n_1 = 1.45$ and $n_s = 1.45$ as an example.

Note from FIG. 3 that larger differences between the indices of refraction require a lesser number of layer pairs to obtain a given value of reflectance. The exemplary prior art coating described in connection with FIG. 1 required at most a few tens of layer-pairs. This is because in the prior art the adjacent layers are comprised of distinctly different materials having large differences in refractive index. Thus in the prior art a small number of layer pairs are required to obtain a given reflectance. In contrast, the present invention relies on formation of a large number of layer-pairs with relatively small differences in the indices of refraction, to achieve the desired reflectance performance.

FIG. 4 is a plot of optical coating spectral bandwidth versus the difference in index of refraction, $n_2 - n_1$, between adjacent layers, and assuming $n_1 = 1.45$. The band width ($\Delta\lambda/\lambda$) for a multilayer, thin-film, dielectric reflector where each layer thickness is equal to one-fourth wavelength is given by $$\frac{\Delta\lambda}{\lambda_o} = \frac{4}{\pi} \sin^{-1} \frac{(n_2 - n_1)}{(n_2 + n_1)} \tag{3}$$

where $\lambda_o$ is the bandwidth (half-height, full width) of the reflectance band centered at $\Delta\lambda_o$. Note that for small differences between $n_2$ and $n_1$ equation 2 simplifies to:

$$\frac{\Delta\lambda}{\lambda_o} \sim \frac{2\Delta n}{\pi n} \tag{4}$$

where $\Delta n = n_2 - n_1$ and $n = (n_2 + n_1)/2$. Thus the change in bandwidth is approximately proportional to $\Delta n$, the difference in indices of the layers.

FIG. 4 shows that using smaller differences in indices of refraction produces smaller bandwidths. Because the present invention permits formation of a large number of layers, in the thousands, a number of groups of different reflector layer-pairs can be formed with each group having a different layer thickness. Each of these different reflector layer-pairs would therefore reflect a different wavelength. A wider band reflector is thus formed using a series of layer-pairs, each having a thickness corresponding to a particular portion of a broad band of wavelength to be reflected. Thus optical reflectors that are fully or partially reflecting across more than one spectral region are fabricated by the present invention by controlling the number of and quarterwave optical thickness of the deposited layers.

Figure 5:
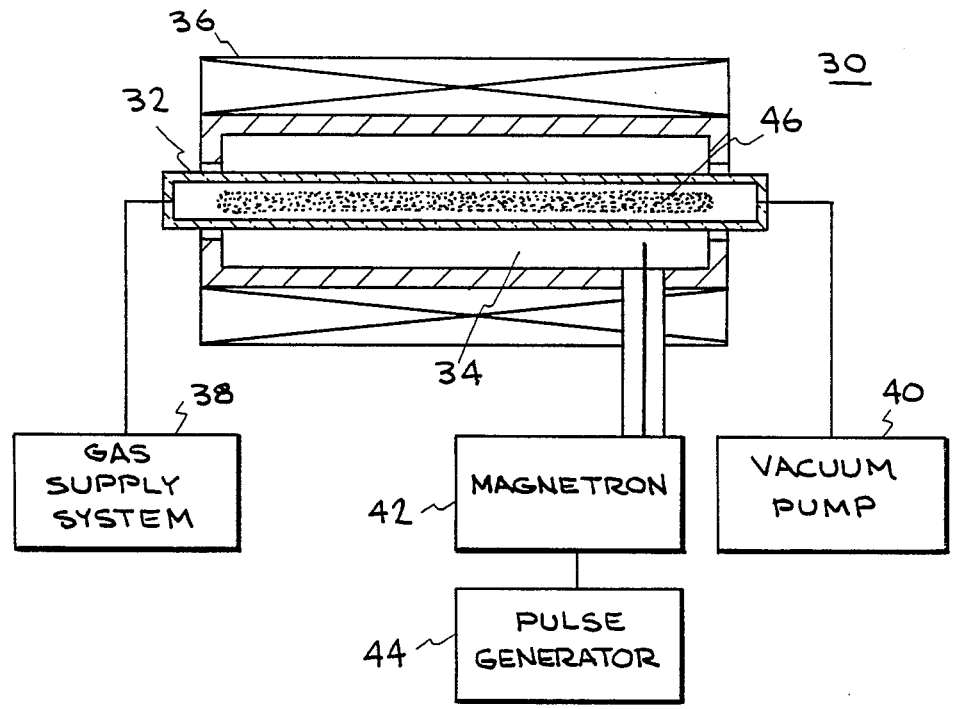
FIG. 5 is a schematic representation of a plasma-assisted CVD system for fabricating protective coatings according to the invention.

FIG. 5 is a schematic representation of a CVD system 30 for producing a series of layers according to the present invention. This system is described in an article by H. Bauch, V. Pacquet, and W. Siefert, "Preparation of Optical Fiber Performs by Plasma-Impulse-CVD", SPIE Vol. 584 *Optical Fiber Characterization and Standards* (1985) p. 33-37. This process is used to make dielectric coatings on the inside of a silica, or quartz, tube 32, which is coaxially positioned in a microwave cavity 34. A surrounding tubular furnace 36 is heated to a high temperature of 1000-1200 degrees Centigrade which permits deposition of films on a heated substrate to avoid inclusion of undesired elements, defects, or discontinuities in the film and to avoid thermomechanical stresses in the films. A gas supply system 38 supplies $SiCl_4$, oxygen, and one or more dopant sources as required to one end of the quartz tube 32. The gases are drawn through the quartz tube 32 by means of a vacuum pump 40 at the other end of the quartz tube 32. After the gases have filled the quartz tube, microwave energy from a magnetron 42 triggered by a pulse generator 44 propagates along the axis of the quartz tube 31 and builds up a plasma 46. The plasma 46 initiates a reaction between the $SiCl_4$ and the oxygen to form $SiO_2$. The pulse duration of about 1.5 ms and the repetition frequency of about 100 cycles per second is adjusted to a continuous flow of gases so that, at the end of the plasma pulse the residual gases flow out and are replaced with a new charge of gases before another microwave pulse is repeated. Each microwave pulse produces a deposit thickness of about 5-10 Angstroms which at a rate of 100 microwave pulses per second corresponds to a deposition rate of 500-100 Angstroms per second. This means that in a few seconds a single layer can be formed having a thickness of 1800 Angstroms, which is an optical quarter-wave thickness for a wavelength of 1060 nm in a material with an index of refraction of 1.45. By alternating quarter-wave layers of different doping concentrations, a reflective coating is thus generated for a particular wavelength.

Figure 6:
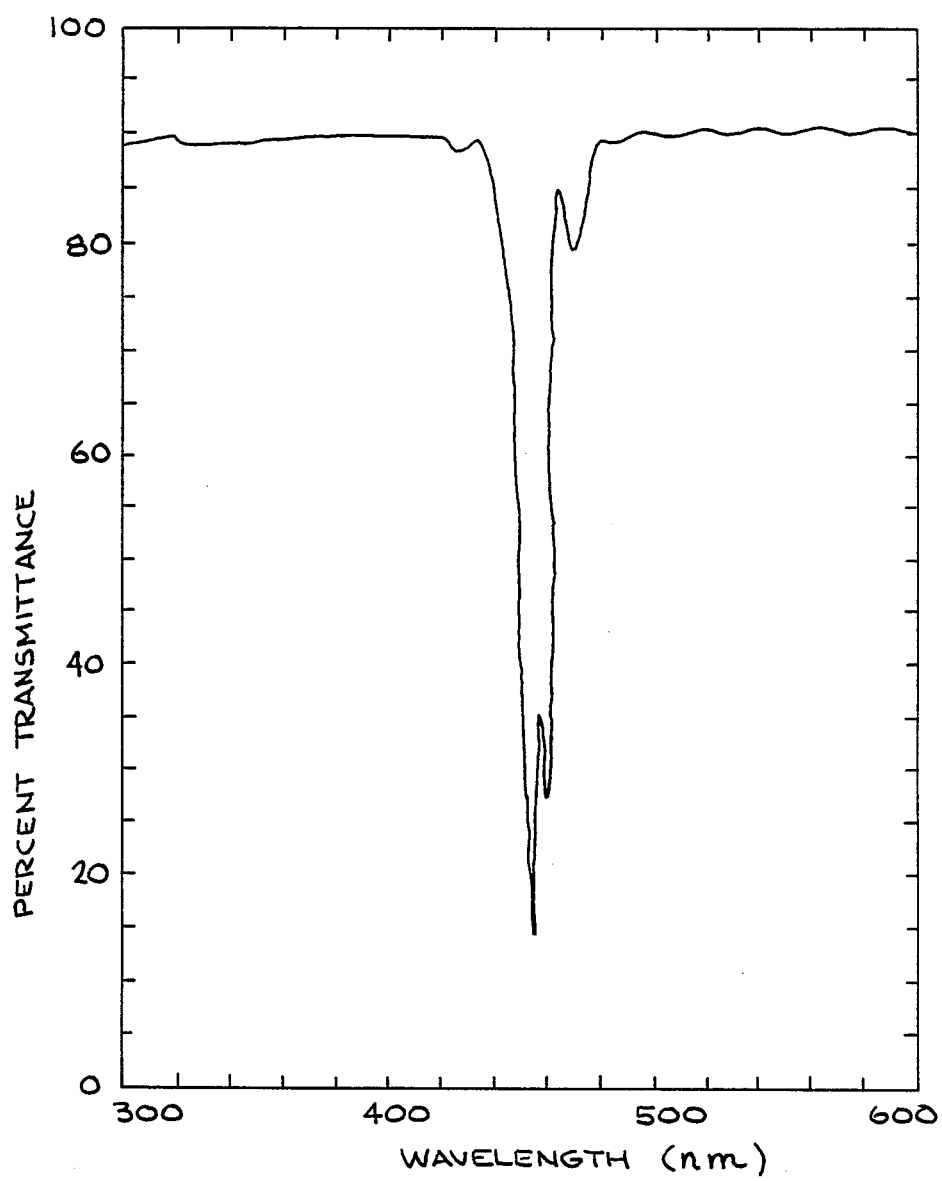
FIG. 6 is a plot of measured transmission versus wavelength for a sample coating fabricated using a plasma CVD process according to the invention.

FIG. 6 is a plot of measured transmission percentage versus wavelength for a sample coating comprised of approximately 1100 layer-pairs on the interior wall of a quartz tube as described in connection with FIG. 5. The sample coating was designed to reflect at 450 nm. The difference between the indices of refraction was 0.016 and the layers were alternately doped with and without F and Ge to obtain the difference in indices of refraction.

Laser damage tests were completed on the optical coating in FIG. 6 by irradiating it with 1.064 $\mu$m wavelength laser pulses having a pulse width of $1.0\times10^{-8}$ sec. The measured energy fluence threshold for laser damage was determined to be 36 $J/cm^2$. Damage thresholds for the best prior art coatings typically range from 5 to 20 $J/cm^2$ when irradiated with 1.06 $\mu$m laser pulses having a pulse width of $1.0\times10^{-8}$ sec. One other sample of an optical coating according to the invention but different from the coating related to FIG. 6, was also tested at 1.064 $\mu$m for damage threshold. The result of this test indicated a damage threshold of greater than 35 $J/cm^2$ for a pulse width of 16-nanoseconds and a pulse repetition frequency of 30 Hz over a 60 second exposure period. Laser damage tests in the visible region of the spectrum using a continuous-wave (cw) laser source gave damage thresholds approximately 4 times greater for the coating in FIG. 6 versus conventional prior art reflective coatings.

Figure 7:
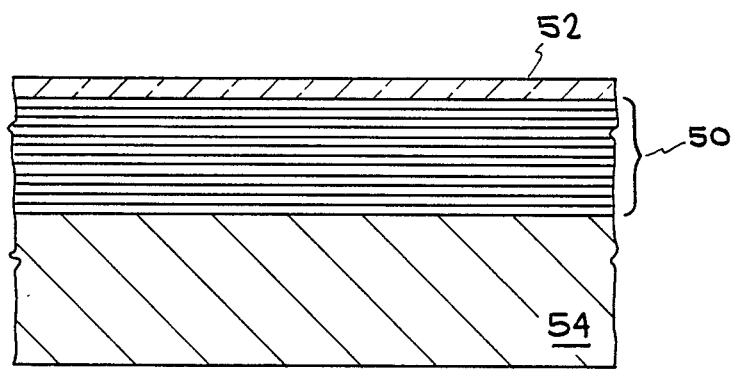
FIG. 7 is a schematic diagrammatic representation of a multilayer coating according to the invention with a protective over-coating and a substrate formed according to the present invention.

FIG. 7 shows a cross-sectional diagrammatic representation of a multilayer reflective coating 50 of doped and undoped layers according to the invention. Overlying the coating 50 is a protective coating 52 of undoped material, such as fused silica, $SiO_2$ formed to a desired thickness using, for example, a high temperature CVD process as described. This protective coating can be formed over reflectors, polarizers, and other optical elements to protect the element from abrasion and wear. In the event of surface damage, such a protective coating could be refinished without disturbance to the underlying reflective coating.

FIG. 7 also shows a substrate 54 which can be formed as thin layers using a CVD process. This substrate 54, which can be formed subsequently or prior to formation of the coating 52, serves as a support substrate for the coating 50 and is made to whatever thickness is required.

FIGS. 8-11 show calculated reflectance plots for coating designs having layer-pairs ranging in number from 150 to 1200. The layer-pairs comprise alternating layers of undoped $SiO_2$ and doped $SiO_2$ with various dopants being used as indicated. These plots were calculated using standard thin film calculation methods and using a thin film software program for IBM compatible personal computers called "FILM*CALC" available from FTG Software Associates, Post Office Box 358, Chatham, N.J., 07928.

Figure 8:
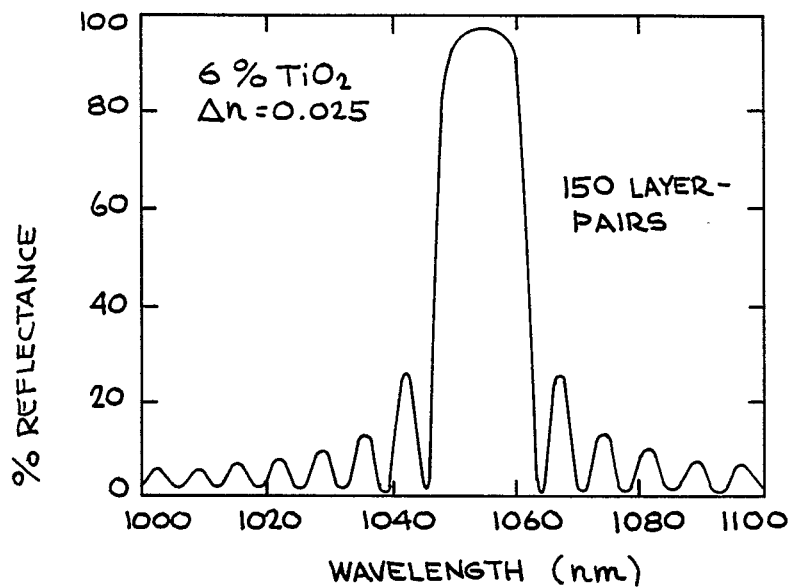
FIG. 8 is a plot of calculated reflectance versus wavelength for 150 layer-pairs of alternating silica and silica doped with $TiO_2$ for a difference in index of refraction of 0.025.

FIG. 8 shows a plot of reflectance versus wavelength for 150 layer-pairs of $SiO_2$ with alternate layers doped with 6 mol % $TiO_2$ which produces a difference in index of refraction of 0.025.

Figure 9:
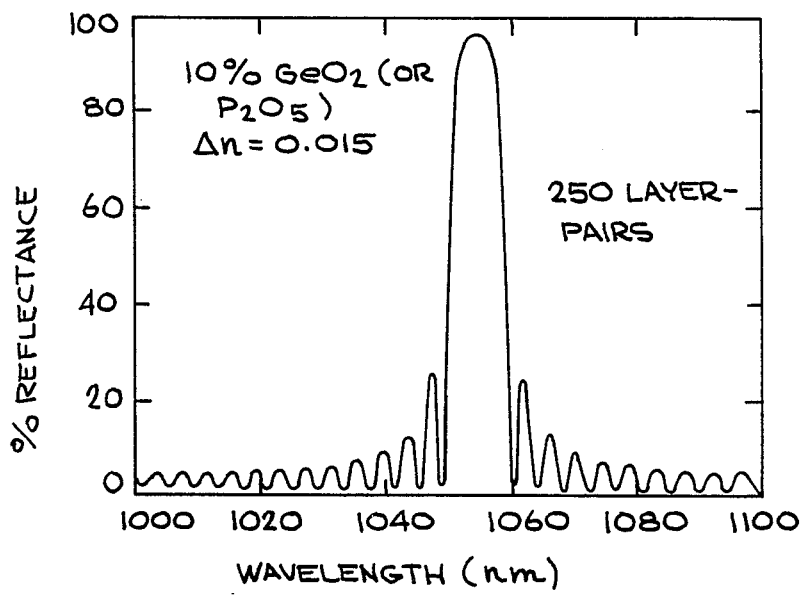
FIG. 9 is a plot of calculated reflectance versus wavelength for 250 layer-pairs of alternating silica and silica doped with $GeO_2$ (or $P_2O_5$) for a difference in index of refraction of 0.015.

FIG. 9 shows a plot of reflectance versus wavelength for 250 layer-pairs of $SiO_2$ with alternate layers doped with 10 mol % $GEO_2$ (or $P_2O_5$) which produces a difference in index of refraction of 0.015.

Figure 10:
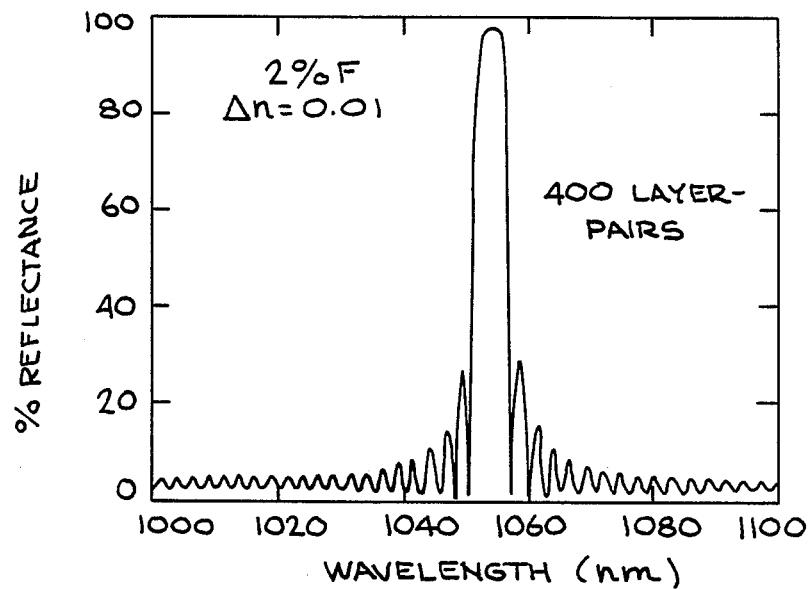
FIG. 10 is a plot of calculated reflectance versus wavelength for 400 layer-pairs of alternating silica and silica doped with F for a difference in index of refraction of 0.01.

FIG. 10 shows a plot of reflectance versus wavelength for 400 layer-pairs of $SiO_2$ with alternate layers doped with 2% F which produces a difference in index of refraction of 0.01.

Figure 11:
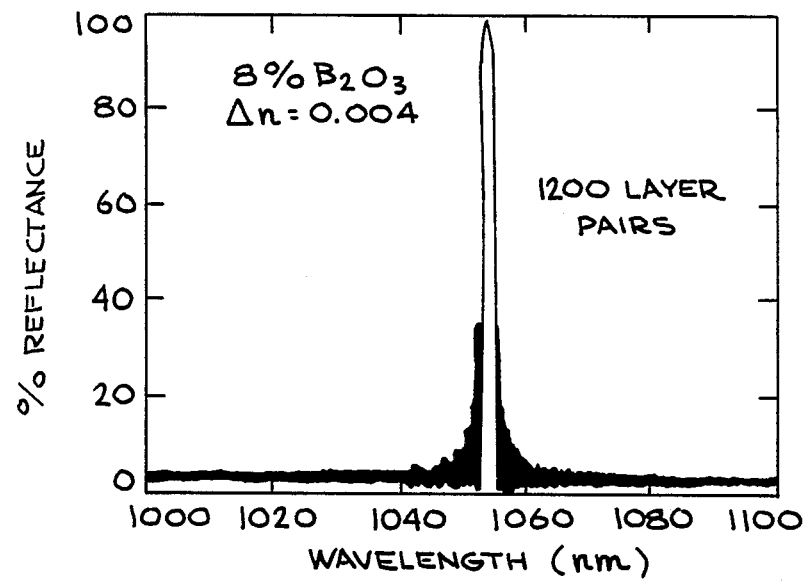
FIG. 11 is a plot of calculated reflectance versus wavelength for 1200 layer-pairs of alternating silica and silica doped with $B_2O_3$ for a difference in index of refraction of 0.004.

FIG. 11 shows a plot of reflectance versus wavelength for 1200 layer-pairs of $SiO_2$ with alternate layers doped with 5% $B_2O_3$ which produces a difference in index of refraction of 0.004.

FIGS. 8-11 show that the number of layer pairs required to achieve high reflectance increases and bandwidth decreases as the magnitude of the index difference decreases. Although these designs contain a large number of layerpairs, since the alternating doped layers are so lightly doped, the damage thresholds for these coatings approach that of undoped $SiO_2$.

Figure 12:
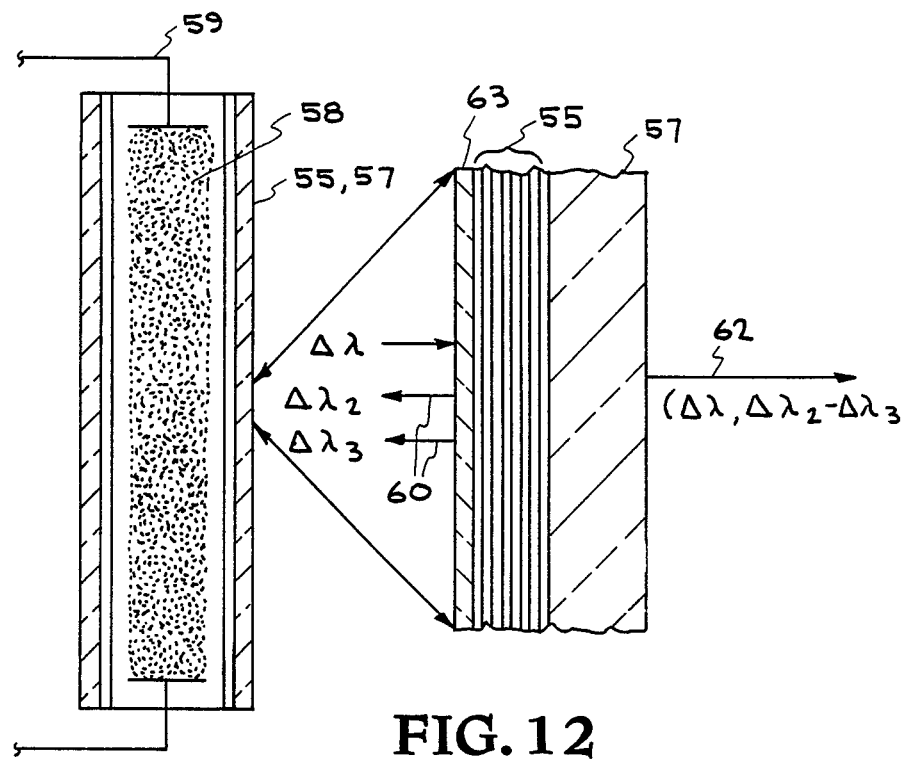
FIG. 12 is a diagrammatic representation of a hot plasma broadband ($\Delta\lambda$) light source for which the fused silica envelope used to contain the plasma is coated on the inside with a composite stack of reflective multilayer coatings that are designed to reflect wavelengths $\Delta\lambda_2$ and $\Delta\lambda_3$ and transmit wavelengths $\Delta\lambda - \Delta\lambda_2 - \Delta\lambda_3$.

FIG. 12 shows a cross-sectional diagrammatic representation of a composite stack of selectively reflective coatings (55) deposited on a fused silica envelope (57) used to tailor the spectral output from a broadband light source such as a hot plasma (58) produced by an electrical discharge. The electrical discharge occurs between two conductors (59) and through the gas media contained inside the envelope (57). A flashlamp is one example of the type of light source shown in FIG. 12.

A composite stack of damage resistant reflective coatings (55) is deposited on either the inside (as shown in FIG. 12) or outside or both of the fused silica envelope surrounding the light source. The composite stack consists of sets of reflective coatings of either alternating doped and undoped layers or differently doped layers with each layer of a particular set of layers having a thickness equal to one fourth of a particular wavelength to be reflected back into the hot plasma (58). The composite stack of reflective coatings (55) is designed to reflect the undesired wavelengths (60) back into the hot plasma (58) while transmitting the desired wavelengths 52). A thick, undoped coating layer (63) is deposited over the composite coating stack (55) to protect it from the hot plasma (58). The protective coating is further described in FIG. 7. The coating has a high resistance to optical damage by the intense flux of broadband optical radiation produced by the light source.

Figure 13:
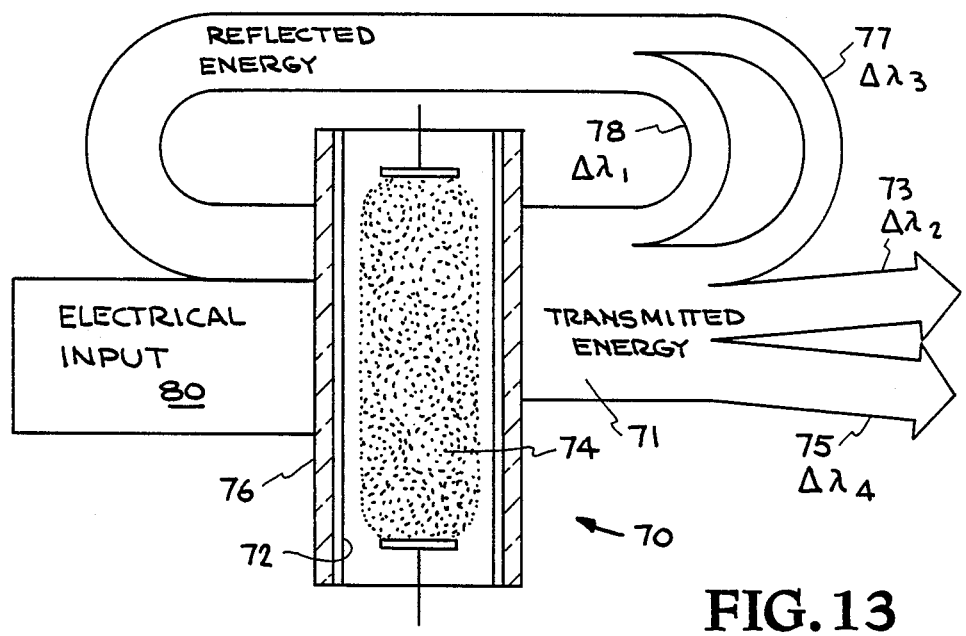
FIG. 13 is a diagrammatic representation of a flashlamp broadband light source for which the fused silica envelope used to contain the plasma is coated on the inside with a composite stack of reflective multilayer coatings designed to transmit wavelength regions and $\Delta\lambda_2$ and $\Delta\lambda_4$ and reflect wavelength regions $\Delta\lambda_3$ and $\Delta\lambda_1$ back into the flashlamp plasma and further schematically illustrating the flow of electrical and optical energy into and out of the flashlamp plasma.

FIG. 13 is a diagrammatic representation of a flashlamp (70) illustrating the flow of electrical energy (80) and optical energy (71) into and out from the hot plasma (74) contained in the flashlamp. The flashlamp is an intense, pulsed broadband light source schematically shown as having a significant optical energy output over the spectral region $\Delta\lambda(71)$. The fused silica envelope (76) that contains the hot plasma is coated on the inside with a composite stack of the inventive reflective coatings (72) and designed to reflect the spectral regions $\lambda_1$ (78) and $\Delta\lambda_3$ (77) and transient light in the spectral regions $\Delta\lambda_2$ (73), and $\Delta\lambda_4$ (75). The reflected light energy (77,78) is reabsorbed by the plasma (74) and then emitted as a broadband emission (71) of $\Delta\lambda$ bandwidth. Thus with the use of the inventive reflective coating, the intense broadband output energy of the flashlamp can be tailored to give one or more outputs over specific spectral bands. Further, the inventive reflective coating remains undamaged by the intense light incident on it.

Figure 14:
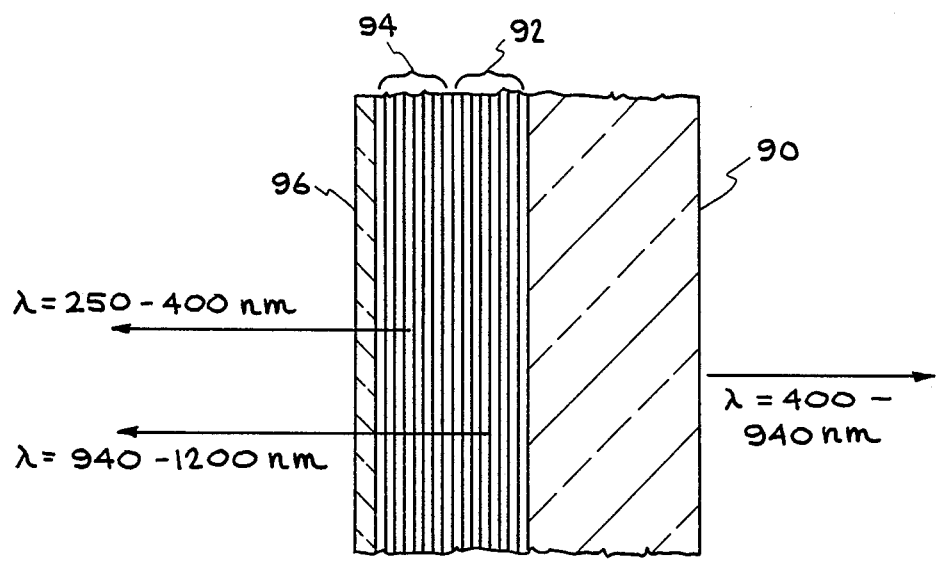
FIG. 14 is a schematic cross-sectional representation of the wall of a flashlamp envelope used to pump a Neodymium-doped solid state laser media and having a dielectric coating for reflecting ultraviolet and infrared energy and a protective coating over the optical coating according to the present invention.

FIG. 14 shows a cross-sectional diagrammatic representation of a portion of a flashlamp envelope wall that specifically designed to pump a Neodymium-containing solid state laser gain medium. The envelope in operation contains a hot plasma giving an intense, pulsed optical energy output which passes through the envelope and is subsequently used to pump the Neodymium energy bands of the solid state laser gain medium. The optical energy produced by a flashlamp is broadband. The energy necessary to pump the host laser falls within narrower band so that a great deal of the flashlamp energy output is wasted because it cannot pump the host laser medium. As described in FIG. 13, reflectors are added to the flashlamp to return undesired energy back into the flashlamp medium. The broadband output energy of the flashlamp output can, in effect, be tailored to match the bandwidth of the pump bands of the host laser. Overall, as described in FIG. 13, this increases the efficiency of converting the electrical energy exciting the flashlamp into stored optical energy in the laser medium. In this specific case the efficiency of a flashlamp can be greatly increased by reflecting energy in the infrared and ultraviolet wavelengths that is not used to pump the Neodymium-doped solid state laser host back into the flashlamp medium. It is desirable to let wavelengths between 400 and 940 nm pump the Neodymium-doped laser host while reflecting ultraviolet wavelengths between 250 and 400 nm and infrared wavelengths between 940 and 1200 nm.

FIG. 14 shows an example of a reflector design for a flashlamp used to pump a Neodymium-doped solid state laser host. The outer wall 90 of the flashlamp is a fused silica tube. An infrared reflective coating 92 designed to reflect between 940 and 1200 nm is formed on the inner surface of the wall 90. In this example, the infrared coating is formed of a composite stack of groups of multilayer-pairs with each of said multilayer-pairs forming a narrowband reflector for predetermined wavelengths within the range of 940 to 1200 nm.

Similarly, an ultraviolet coating 94 is formed adjacent the infrared reflective coating 92. In this example, the ultraviolet coating is formed of a composite stack of groups of multilayer-pairs with each of said pairs forming a narrowband reflector for predetermined wavelengths within the range of 250 to 400 nm.

A protective coating 96 of pure $SiO_2$ is formed as the inner surface of the flashlamp. The protective coating is designed to protect the groups of reflective layer-pairs from corrosion by the hot flashlamp plasma. In this example the protective coating overlies the ultraviolet reflective coating 94.

Figure 15:
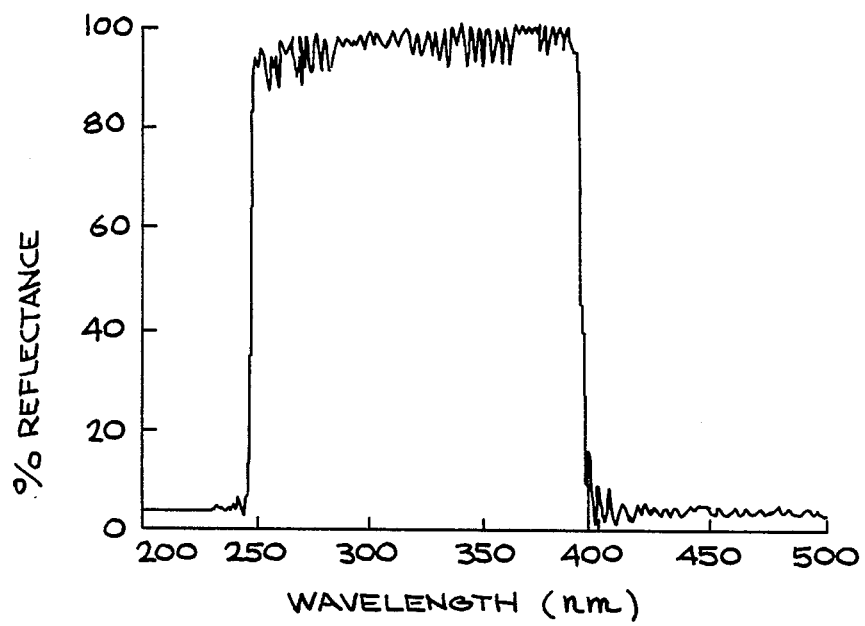
FIG. 15 is a plot of calculated percent reflectance versus wavelength for the ultraviolet range of the flashlamp coating of FIG. 14.

FIG. 15 shows a plot of calculated reflectance versus wavelength for the ultraviolet coating 94 of the flashlamp coating of FIG. 14. In this specific example, the ultraviolet coating is formed of a stack of 32 groups of 100 layer pairs with each of said layer-pairs forming a narrowband reflector for predetermined wavelengths within the range of 250–450 nm. The difference in indices of refraction for alternate layers is 0.05 with the thickness of each layer being the optical quarter-wave thickness.

Table 1 is a chart indicating the nominal wavelength, bandwidth, and number of layer pairs for each of the narrowband reflectors forming the composite broadband ultraviolet reflective coating for the flashlamp.

TABLE 1

| $\lambda$ max (nm) | $\Delta \lambda$ (nm) | # of layer pairs |
|---|---|---|
| 250 | 5 | 100 |
| 255 | 5 | 100 |
| 260 | 5 | 100 |
| 265 | 5 | 100 |
| . | . | . |
| . | . | . |
| . | . | . |
| 390 | 8 | 100 |
| 395 | 8 | 100 |
| 400 | 8 | 100 |
| | | $\Sigma$ 3200 layer pairs |

FIG. 14 shows that broadband reflectors of the type described immediately above can be obtained by, in effect, cascading a series of narrowband reflective coatings of the type described in connection with FIGS. 1 and 8–11.

The foregoing description of the preferred embodiments of the invention have been presented for purposes of illustration and description. It is not intended to be exhaustive or to limit the invention to the precise form disclosed and many modifications and variations are possible in light of the above teachings. The preferred embodiments have been chosen and described in order to best describe the principles of the invention, and its practical applications, to thereby enable others skilled in the art to best utilize the invention and various embodiments with various modifications as are suited to the particular use contemplated. It is intended that the scope of the invention be defined by the claims appended hereto.

What is claimed is:

1. An optical interference coating resistant to damage by intense optical radiation and comprising a number of interference layers of a given parent dielectric material, wherein adjacent layers in the coating have slightly different indices of refraction produced by doping at least some of the layers with one or more dopants wherein said one or more dopants are used in small concentrations so that the coating layers substantially retain the same physical and chemical properties of the parent, undoped dielectric material and the coating layers are thereby thermomechanically and chemically compatible.

2. The optical coating of claim 1 wherein a first layer has an index of refraction $n_1$ and a second, adjacent layer has an index of refraction $n_2$ and wherein the difference between indices of refraction that is produced by using one or more dopants is between 0.1 to 15% of the value of the parent dielectric material.

3. The optical coating of claim 2 wherein the number of doped layers is greater than 100.

4. The optical coating of claim 1 wherein said coating is formed in a controlled atmosphere at a temperature sufficiently high enough to ensure that the coating and any foreign particulate contained in said coating are oxidized in order to reduce or prevent bulk and localized energy absorption in said coating when said coating is subject to high energy flux densities.

5. The optical coating of claim 4 wherein said coating has an extremely low optical absorption loss, equal to or less than a value 0.0002% of the incident light energy.

6. The coating of claim 4 wherein said oxidizing atmosphere is selected from the group of gases $O_2$, $H_2O$, $Cl_2$, $F_2$, or combinations of these gases.

7. The coating of claim 6 wherein said oxidizing atmosphere is $O_2$.

8. The optical coating of claim 1 wherein each of said layers is deposited at full density in an amorphous state to reduce voids or microcrystalline defects in said coating.

9. The optical coating of claim 1 wherein said parent dielectric, undoped material is fused silica, $SiO_2$.

10. The optical coating of claim 1 wherein the material is doped with a doping material selected from the group of $TiO_2$, $GeO_2$, $P_2O_5$, F, $B_2O_3$, N, $Ta_2O_5$, $Al_2O_3$, Cl, $Ce_2O_3$ or $Sb_2O_3$.

11. The optical coating of claim 1 wherein the material is doped with a combination of $GeO_2$ and F.

12. The optical coating of claim 1 wherein said thin layers are formed by a chemical vapor deposition process.

13. The optical coating of claim 12 wherein said chemical vapor deposition process is plasma-assisted.

14. The optical coating of claim 13 wherein said plasma assisted chemical vapor deposition process is a high temperature process with a temperature above 1000° C.

15. The optical coating of claim 12 wherein said chemical vapor deposition process is a high temperature process with a temperature above 1300° C.

16. The optical coating claim 1 comprising one or more additional layers of undoped material of arbitrary thickness formed adjacent said alternating doped and undoped layers to provide a protective overcoating of undoped material for said optical coating.

17. The optical coating of claim 1 comprising additional layers of material formed adjacent said alternately doped and undoped layers, said additional layers formed sufficiently thick to provide a support substrate for said alternately doped and undoped layers.

18. A reflective optical coating highly resistant to damage by intense optical radiation and comprising a first plurality of alternating layers having different indices of refraction formed by doping at least some of said layers with one or more dopants, wherein each of said layers has a thickness of one-fourth wavelength for a first wavelength, which coating forms a first narrow band reflector for said first wavelength.

19. The optical coating of claim 18 including a second plurality of alternating doped and undoped layer formed adjacent to said first plurality of layers, each of said second plurality of layers having a thickness of one quarter-wave wavelength for a second wavelength, said second plurality of layers forming a second narrow band reflector, the combination of said first and said second pluralities of layers forming a reflector having a bandwidth broader than the bandwidth of said first reflector or of said second reflector.

20. The optical reflective coating of claim 19 comprised of a composite stack of multilayer, narrowband reflectors applied to a fused silica envelope surrounding an intense broadband light emitting hot plasma produced by gas discharge and such coating designed to reflect wavelengths back into the plasma and transmit desired wavelengths out through the fused silica envelope.

21. The optical reflective coating of claim 20 deposited on the fused silica envelope of a broadband flash lamp light source.

22. The optical reflective coating of claim 20 deposited on the fused silica envelope of a flashlamp broad band light source used to pump a solid state laser gain medium.

23. The optical coating of claim 22 deposited on the fused silica envelope of a flashlamp, broadband light source used to pump a Neodymium-doped solid state laser gain medium and such coating designed to reflect certain predetermined wavelengths back into the plasma to be reabsorbed and re-emitted to thereby improve the conversion efficiency of electrical energy to optical energy at the desired wavelength of said flash lamp.

24. The improvement of claim 23 wherein said reflective coating reflects wavelengths in the infrared region between 950 and 1200 nm.

25. The improvement of claim 23 wherein said reflective coating reflects wavelengths in the ultraviolet region between 250 and 400 nm.

26. The improvement of claim 23 wherein said reflective coating does not reflect wavelengths in the range of 400 to 940 nm to permit transmission of optical energy matched to the pump bands of said Neodymium-doped solid-state laser gain medium.

27. An optical coating highly resistant to damage by intense optical radiation and formed of very small step wise incremental deposits of a dielectric material, each of said incremental deposits being doped with one or more doping materials to slightly alter the index of refraction of adjacent incremental deposits to form a predetermined stepwise profile for the index of refraction of said coating.

28. The coating of claim 27 wherein the stepwise incremental deposits are doped to provide an index of refraction approximating a sinewave.

29. The coating of claim 27 wherein said stepwise incremental deposits have a thickness of 5–10 Angstroms.

* * * * *